US011080523B2

(12) United States Patent
Gehere et al.

(10) Patent No.: US 11,080,523 B2
(45) Date of Patent: Aug. 3, 2021

(54) METHOD FOR PATTERN RECOGNITION IN A PLURALITY OF SIGNALS

(71) Applicants: CENTRE NATIONAL DE LA RECHERCHE SCIENTIFIQUE—CNRS, Paris (FR); INSERM (INSTITUT NATIONAL DE LA SANTÉ ET DE LA RECHERCHE MÉDICALE), Paris (FR); SORBONNE UNIVERSITE, Paris (FR)

(72) Inventors: Kevin Gehere, Magnanville (FR); Germain Haessig, Saverne (FR); Ryad Benosman, Pantin (FR); Sio Hoi Ieng, Montreuil (FR); José-Alain Sahel, Paris (FR); Guillaume Chenegros, Trappes (FR); Nicolas Libert, Paris (FR)

(73) Assignees: CENTRE NATIONAL DE LA RECHERCHE SCIENTIFIQUE—CNRS, Paris (FR); SORBONNE UNIVERSITE, Paris (FR); INSERM (INSTITUT NATIONAL DE LA SANTÉ ET DE LA RECHERCHE MÉDICALE), Paris (FR)

( * ) Notice: Subject to any disclaimer, the term of this patent is extended or adjusted under 35 U.S.C. 154(b) by 0 days.

(21) Appl. No.: 16/331,808

(22) PCT Filed: Sep. 8, 2017

(86) PCT No.: PCT/FR2017/052393
§ 371 (c)(1),
(2) Date: Mar. 8, 2019

(87) PCT Pub. No.: WO2018/046868
PCT Pub. Date: Mar. 15, 2018

(65) Prior Publication Data
US 2019/0370542 A1    Dec. 5, 2019

(30) Foreign Application Priority Data

Sep. 9, 2016   (FR) ..................................... 16 58424

(51) Int. Cl.
*G06K 9/00*        (2006.01)
*G06F 17/18*      (2006.01)
*G06N 7/00*       (2006.01)

(52) U.S. Cl.
CPC ......... *G06K 9/00496* (2013.01); *G06F 17/18* (2013.01); *G06N 7/005* (2013.01)

(58) Field of Classification Search
CPC ..... G06K 9/00496; G06F 17/18; G06N 7/005
See application file for complete search history.

(56) References Cited

U.S. PATENT DOCUMENTS 3,598,110 A *   8/1971   Edmark ............... A61B 5/0464
                                                                                                            600/515
6,684,100 B1 *   1/2004   Sweeney ............. A61B 5/7264
                                                                                                           600/517

(Continued)

FOREIGN PATENT DOCUMENTS

WO     WO-2007019498 A2 *   2/2007   ............. H03M 3/00
WO     2016/146937 A1        9/2016

OTHER PUBLICATIONS

Alireza Vahdatpour et al: "Toward Unsupervised Activity Discovery Using Multi-Dimensional Motif Detection in Time Series", Jul. 11, 2009 (Jul. 11, 2009), XP055375602, Retrieved from the Internet <URL:https://www.ijcai.org/Proceedings/09/Papers/212.pdf> [retrieved on 20170523] *.

(Continued)

*Primary Examiner* — Jon Chang
(74) *Attorney, Agent, or Firm* — Nixon & Vanderhye

(57) ABSTRACT

Disclosed is a method for pattern recognition in a plurality of received time signals of different types, the method (Continued)

includes: b) for each received signal, creating an asynchronous time signal including events; c) for each created asynchronous signal, creating an activity profile of the asynchronous signal which decreases as a function of the time elapsed since the last event of the asynchronous signal; d) for a given time $t_0$: d1) determining a context defined as the set of activity profiles of the created asynchronous signals, d2) determining a standard context among predetermined standard contexts, having a minimum distance to the context determined in step d1, d3) determining the pattern as a function of the determined standard context.

12 Claims, 9 Drawing Sheets

(56) References Cited

U.S. PATENT DOCUMENTS

| | | |
|---|---|---|
| 7,151,490 B2 | 12/2006 | Richards |
| 2010/0137728 A1* | 6/2010 | Govari ............... A61B 5/04525 600/515 |
| 2011/0004421 A1 | 1/2011 | Rosewell et al. |
| 2014/0039274 A1 | 2/2014 | Sarrafzadeh et al. |
| 2016/0058318 A1* | 3/2016 | Borjigin ............... A61B 5/7275 600/516 |

OTHER PUBLICATIONS

Joon Ahn et al: "RISA: Distributed Road Information Sharing Architecture", INFOCOM, 2012 Proceedings IEEE, IEEE, Mar. 25, 2012 (Mar. 25, 2012), pp. 1494-1502, XP032178877, ISBN: 978-1-4673-0773-4, DOI: 10.1109/INFCOM.2012.6195516.

Raffay Hamid et al: "Unsupervised Activity Discovery and Characterization From Event-Streams *", Jul. 4, 2012 (Jul. 4, 2012), XP055375598, Retrieved from the Internet <URL:https://arxiv.org/ftp/arxiv/papers/1207/1207.1381.pdf> [retrieved on May 23, 2017].

International Search Report, dated Dec. 7, 2017, from corresponding PCT/FR2017/052393 application.

* cited by examiner

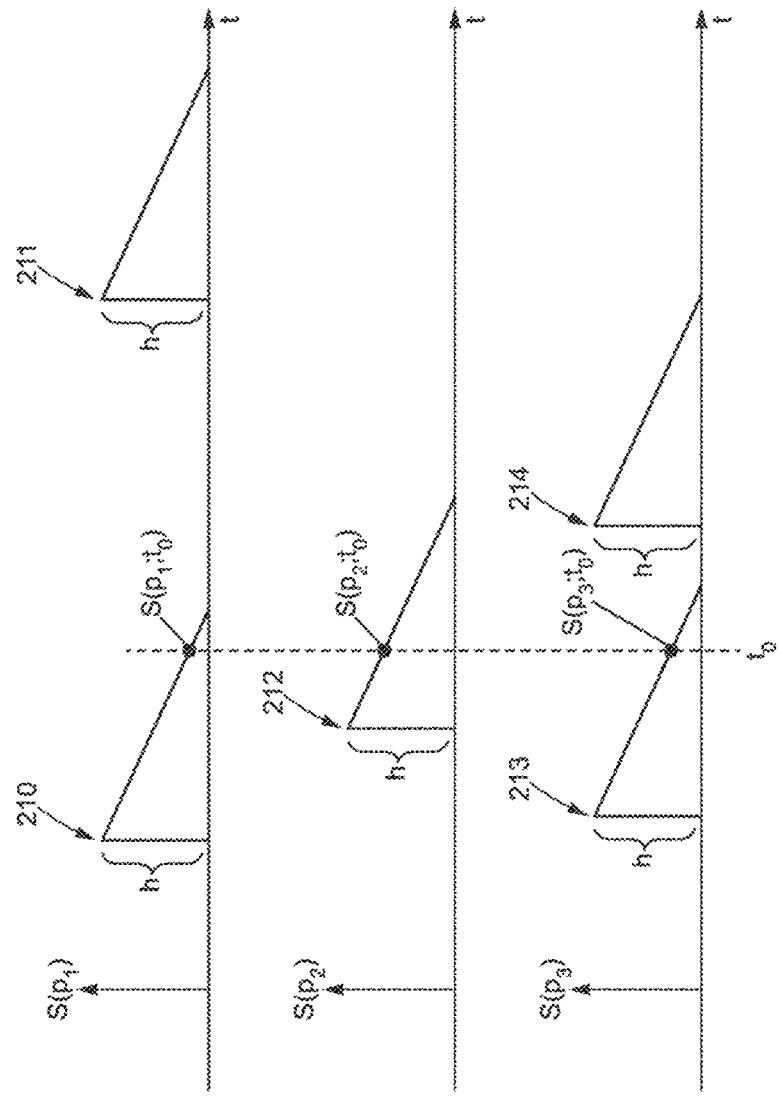

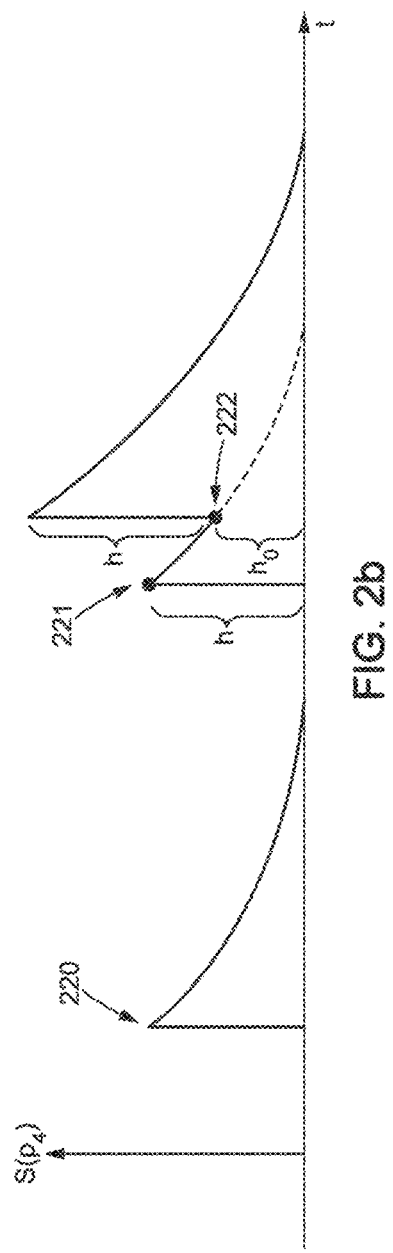

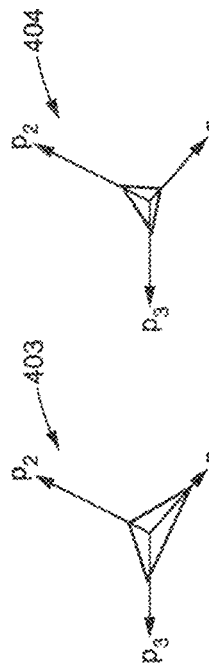
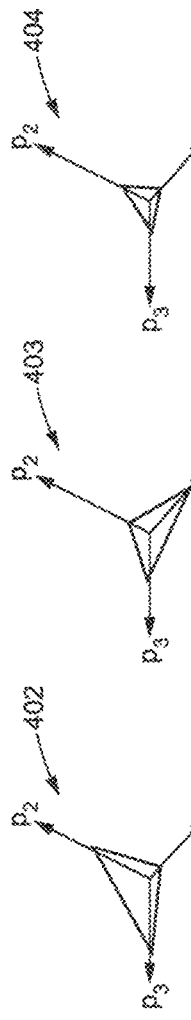
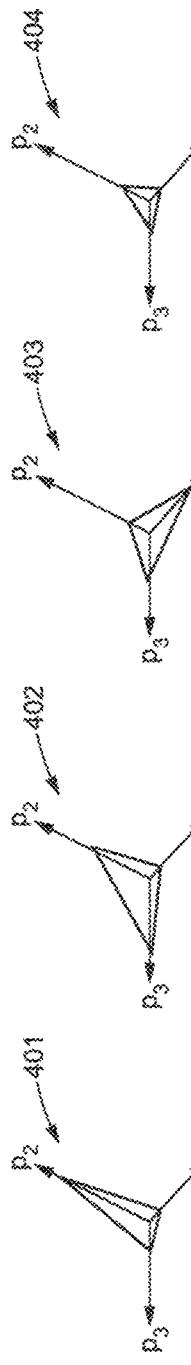
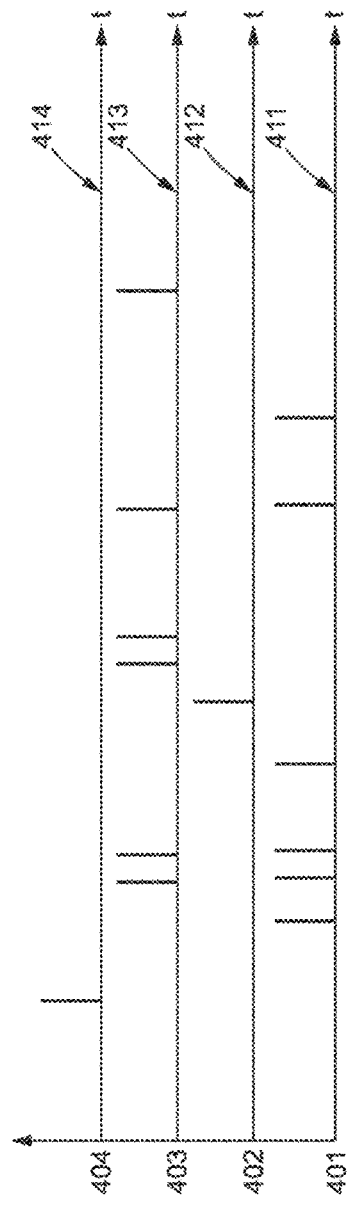

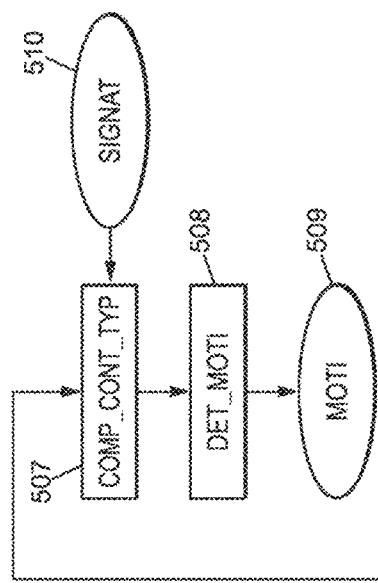
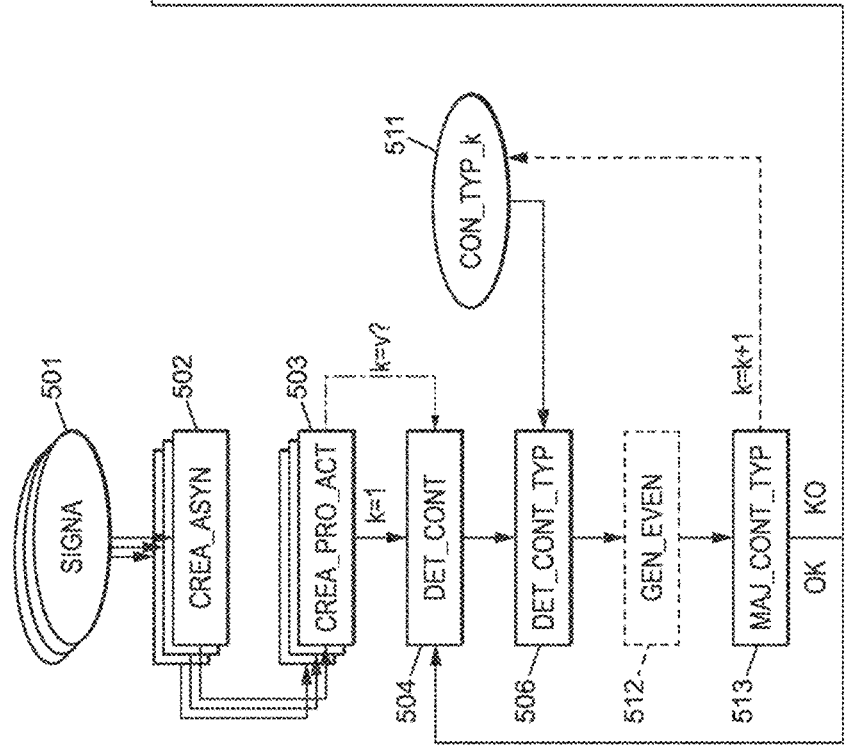
FIG. 5b

METHOD FOR PATTERN RECOGNITION IN A PLURALITY OF SIGNALS

BACKGROUND OF THE INVENTION

Field of the Invention

This invention relates to the field of complex signal analysis, in particular for the detection of certain particular patterns in signals of different types.

Description of the Related Art

Thanks to the decrease in the manufacturing costs of sensors and thanks to the miniaturisation thereof, the latter are present everywhere today, whether for health data monitoring (e.g. smart watch that measures the heart rate, blood pressure, blood velocity, the temperature, the quality of sleep, etc.) or industrial data (temperature in a machine room, presence of CO2, aeration speed, etc.).

Analysing this data is a genuine challenge in order to be able to valorise the data coming from these sensors.

Analysing a single signal does not give rise to a problem per se, because this analysis most often reverts to processing the curve with known mathematic tools (e.g. calculating derivatives, variability analysis, etc.).

However, when an analysis seeks to apprehend multiple signals that do not have the same scales/magnitudes/etc., it can be difficult to combine these signals in order to detect certain patterns. For the purposes of information only, these patterns can be:
- detecting the warning signs of a stroke in a patient thanks to heart rate, arterial flow and heart rate regularity signals;
- detecting fouling problems of an industrial engine thanks to temperature, CO2 percentage, and consumption signals.

Indeed, analysing a single signal can give erroneous results:
- the increase in the heart rate, alone, can mean that the patient is running or that he is in cardiac distress;
- the increase in the consumption of the industrial machine can mean that the carburation of the engine is working poorly or that the operator has requested an increase in the rate of production.

Although particular solutions for analysing signals of different types can be found on a case-by-case basis (i.e. according to the types of signals in question), there is a need to have a generic method for detecting patterns in these complex signals.

BRIEF SUMMARY OF THE INVENTION

This invention improves the situation.

To this effect, this invention proposes a generic method that allows for a simplified analysis of complex signals.

This invention then relates to a method for pattern recognition in a plurality of time signals of different types, the method comprises:
/a/ receiving the plurality of time signals;
/b/ for each received signal of the plurality of signals, creating an asynchronous time signal comprising events, said events being of the same forms of the asynchronous signal representative of a characteristic of the received signal;
/c/ for each created asynchronous signal, creating an activity profile of said asynchronous signal, the activity profile comprises at least one activity value that decreases as a function of the time elapsed since an event that is the most recent among the successive events of said asynchronous signal;
/d/ for a given time:
/d1/ determining a context, said context being defined as the set of activity profiles, at the given time, of the created asynchronous signals,
/d2/ determining a standard context from among a set of predetermined standard contexts, the determined standard context having, among the set of standard contexts, a minimum distance to the context determined in step /d1/,
/d3/ determining the pattern as a function of said predetermined standard context.

The distances can be distances in the mathematical sense. Thus, the distances can be Euclidean distances, Manhattan distances, Minkoswki distances, Tchebychev distances or any other distances.

In another embodiment, it is possible to take account of a hierarchical model for the standard contexts used.

This invention also alternatively relates to a method for pattern recognition in a plurality of time signals of different types, a hierarchical model of standard contexts being defined, each standard context being associated with a respective level of the hierarchical model, the method comprises:
/a/ receiving the plurality of time signals;
/b/ for each received signal of the plurality of signals, creating an asynchronous time signal comprising events, said events being of the same forms of the asynchronous signal representative of a characteristic of the received signal;
/b'/ use of the events of each asynchronous signal as current events and use of the standard contexts of the first level of the hierarchical model as current standard contexts;
/c/ for each created asynchronous signal, creating an activity profile of said asynchronous signal, the activity profile comprises at least one activity value that decreases as a function of the time elapsed since an event that is the most recent among the successive events of said asynchronous signal;
/d/ for each given time among a plurality of given times:
/d1/ determining a context, said context being defined as the set of the values of the activity profiles, at the given time, of the created asynchronous signals,
/d2/ determining a standard context among the current standard contexts, the determined standard context having, among the set of current standard contexts, a minimum distance to the context determined in step /d1/,
/d3/ if a level of the hierarchical model has not been used, generating of an event for an asynchronous signal as a function of the current standard context identified in step /d2/;
/e/ if a level of the hierarchical model has not been used:
use of the events generated in step /d3/ as current events,
use of the standard contexts of a level of the hierarchical model not yet used as current standard contexts;
re-executing of the steps /c/ to /f/,
/f/ if all of the levels of the hierarchical model have been used:
determining a pattern in the plurality of received signals via a comparison of the standard contexts determined at the last occurrence of the step /d2/ with a base of standard signatures.

These hierarchical levels make it possible to proceed with a step-by-step recognition: the first hierarchical level makes it possible to identify very basic forms, with hierarchical levels of a superior order making it possible to identify more complex shapes from the lower levels.

In an embodiment, the comparison of the step /f/ can comprise the calculation of a Bhattacharyya distance.

Indeed, it has been observed experimentally that this distance allowed for better quality recognition.

Moreover, the comparison of the step /f/ can comprise the calculating of a standardised distance.

In another alternative or cumulative embodiment, the comparison of the step /f/ can be a comparison between a number of occurrences of determining standard contexts at the last occurrence of the step /d2/ with a base of standard signatures.

The decrease in the activity profile can be as a function of the level of the current hierarchical model.

This adaptation can make it possible to grant a slower decreasing speed for the higher hierarchical levels in order to have a reactivity for these lower levels. Inversely, the lower level hierarchical levels (i.e. the first used) can have a higher reactivity.

A computer program, implementing all or a portion of the method described hereinabove, installed on a pre-existing piece of equipment, is in itself advantageous, when it allows for pattern recognition in a plurality of signals.

Thus, this invention also relates to a computer program comprising instructions for implementing the method described hereinabove, when this program is executed by a processor.

This program can use any programming language (for example, an object-oriented language or other), and be in the form of source code that can be interpreted, a partially compiled code or a fully compiled code.

FIGS. 5a and 5b described in detail hereinafter, can form the flowchart of the general algorithm of such a computer program.

BRIEF DESCRIPTION OF THE DRAWINGS

Other characteristics and advantages of the invention shall further appear when reading the following description. The latter is purely for the purposes of information and must be read along with the accompanying drawings wherein:

FIGS. 2a and 2b are "activity profile" examples for the events coming from received signals;

FIGS. 4a to 4d are examples of a representation of four standard contexts;

FIG. 4e is an example of generating four event flows from the recognition in a signal of standard contexts of FIGS. 4a to 4d;

FIG. 5b is an example of a flowchart of a method according to another possible embodiment of the invention (i.e. with the use of a hierarchical model of standard contexts);

DETAILED DESCRIPTION OF THE PREFERRED EMBODIMENTS

Figure 1B:
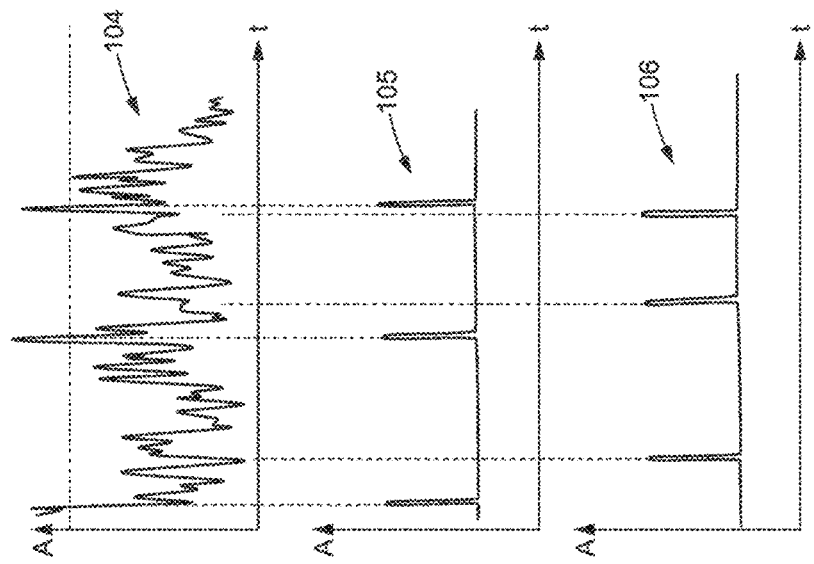
FIG. 1b shows a generating of events from a signal that represents a respiratory rate.
Figure 1A:
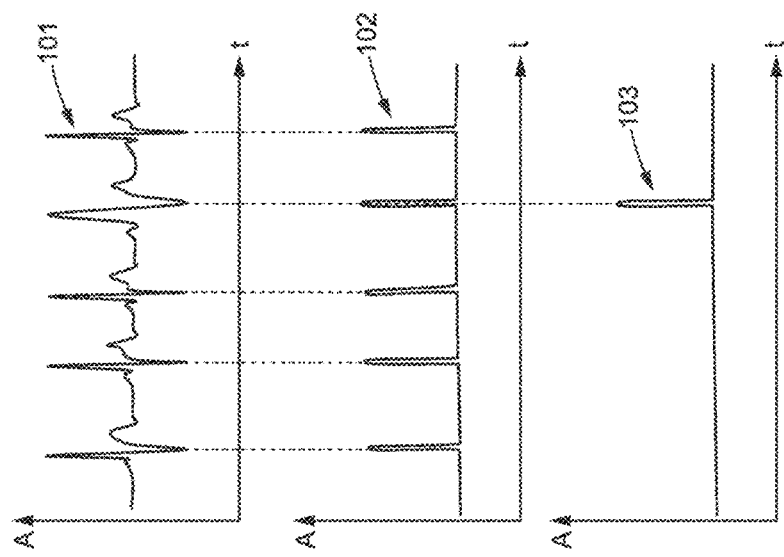
FIG. 1a shows a generating of events from a signal that represents a heart rate.

FIG. 1a shows a generating of events from a signal that represents a heart rate.

In this example, the curve 101 represents a heart rate. This curve can be received in the form of continuous data (e.g. analogue signal) or in the form of sampled data (e.g. digital signal).

During the receiving of the signal, it is possible to determine certain characteristics that are proper to the signal. These characteristics can be, in a non-limiting manner:
- the appearance of a particular pattern in the signal (e.g. appearance of a wave R (or QRS complex) in an electrocardiogram or the end of an engine cycle for a machine-tool);
- the variability of a pattern of the signal (e.g. variability of the repetition period of the wave R in an electrocardiogram or variability of an engine cycle time for a machine-tool);
- the temporal width of certain patterns (e.g. width of the interval QT in an electrocardiogram or engine cycle time for a machine-tool);
- the maximum value of an amplitude of the signal;
- etc.

Of course, these characteristics can be representative of a function of the signal (e.g. of the derivative of the signal or of any mathematical transformation of the signal).

According to these characteristics of the signal, it is possible to generate a so-called "asynchronous" signal comprising markers or events (e.g. curve 102 or 103). These events are most often Diracs in the asynchronous signal, because the generation thereof is simple. However, these events can be any pattern (e.g. signal that is triangular, rectangular, sinusoidal portion, portion of an alternating signal, etc.). Each event of said asynchronous signal is advantageously the same pattern or a similar pattern (their amplitude or their polarity (i.e. their direction in relation to the value zero) can however change from one event to another).

For the purposes of information, the curve 102 is an asynchronous signal of which the events are generated during the appearance of a QRS complex in the electrocardiogram of the curve 101.

Also for the purposes of information, the curve 103 is an asynchronous signal of which the events are generated when the width of a QRS complex of the electrocardiogram of the curve 101 exceeds a target value (e.g. average over the x preceding minutes).

FIG. 1b shows a generating of events from a signal 104 that represents a respiratory rate.

This example is substantially identical to the example of FIG. 1a and the preceding developments therefore apply thereto.

For the purposes of information, the curve 105 is an asynchronous signal of which the events are generated when the respiratory rate exceeds a predetermined threshold (i.e. dotted horizontal line) in the curve 104.

Also for the purposes of information, the curve 106 is an asynchronous signal of which the events are generated when the derivative of the respiratory rate exceeds a target value in the curve 104.

Regardless of the characteristics used for the generating of events, this generating makes it possible to transform signals of different types (e.g. the curves 101 and 104 not being generated using the same type of sensors and/or same sources of information and/or representative of different physical concepts) into comparable asynchronous signals (e.g. 102 and 106). Then, the work of identifying the patterns is simplified.

FIGS. 2a and 2b are examples of three «activity profiles» t→S, for the events coming from three received signals $p_1$, $p_2$ and $p_3$.

In this example, and in the absence of events, the value of $S(p_1, t)$, $S(p_2, t)$ or $S(p_3, t)$ is zero.

However, during the occurrence of an event (for example, 210) in the signal $p_1$, $S(p_1, t)$ takes a predetermined threshold value (here h, with this value h able to be unitary).

The value of the activity profile $S(p_1, t)$ then decreases progressively after this event to approach 0.

The same applies for the event 211 for the signal $p_1$, for the event 212 for the signal $p_2$, or for the event 213/214 for the signal $p_3$.

Although the decrease in the signal/activity profile S is here linear, it is possible to provide any type of decrease such as an exponential decrease:

$$h \cdot e^{-\frac{t-t_p}{\tau}}$$

This exponential decrease can be shown in FIG. 2b (see the event 220, for example). The nature and the parameters of this decrease can be chosen and different for each signal analysed.

Moreover, it is possible that, during the occurrence of an event for the signal in question (e.g. $p_4$ here), the value of the function S is not negligible in relation to the value of h (e.g. the event 221 is temporally close to the event 222).

In an embodiment, during the occurrence of the later event 222, the value of the activity profile S can be set to the sum (optionally weighted) of the current value of S just before the event 222 (i.e. $h_0$) and of h. Thus, the decrease of the curve S will start from the value $h+h_0$ as shown in FIG. 2b. Moreover, it is possible to provide that the value of $h+h_0$ is capped at a predetermined value h1 (i.e. $\min(h_1, h+h_0)$).

In another embodiment, during the occurrence of the later event 222, the value of the curve S is set to the value h regardless of the value of $h_0$ (i.e. the events prior to the last event (i.e. the later event) are ignored). In this other embodiment, it is possible to define a time referred to as "last event time" defined as follows:

$$T(p,i) = \max(t_j)|j<i$$

or $$T(p,t) = \max(t_j)|t_j<t$$

with $t_j$ the times of events occurring for a signal p.

Conceptually, p→T(p, t) defines a map of the times of the last events occurred temporally just before a reference time (i.e. t).

It is then possible to define, in this other embodiment, p→S(p, t) as being a function of this map p→T(p, t).

For example, p→S(p, t):

$$p \rightarrow S(p, t): \begin{cases} h \cdot e^{-\frac{t-T(p,t)}{\tau}} & si\ t \geq T(p, t) \\ 0 & sinon \end{cases}$$

with τ and h a predetermined time constant (S can be any function that decreases over time t over an interval comprising as lower limit T(p, t)).

The function p→S(p, t) is called the "context" of the input signals for a given time t.

The creation of a context p→S(p, t) as described hereinabove, is advantageous, as it allows for a continuous and simple representation of discontinuous concepts (i.e. the events). This created profile makes it possible to transform the representation of the events in a domain that is simple to apprehend.

Then, the creation thereof simplifies the handling and the comparing of events.

The context of the input signals can be read simply in FIG. 2a. Thus, for the signals $p_1$, $p_2$, $p_3$ the context for the time $t_0$ can be read vertically on the dotted line and can be represented in the form of the following vector:

$$\begin{cases} S(p_1; t_0) \\ S(p_2; t_0) \\ S(p_3; t_0) \end{cases}$$

Figure 3B:
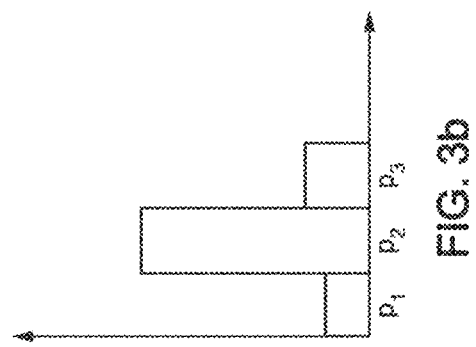
FIGS. 3a and 3b are examples of a representation of a determined context from three received signals.

This vector can be represented graphically in the form of a "spider" graph (e.g. FIG. 3a) or in the form of a histogram (e.g. FIG. 3b). Of course, any form of graphical representation can be considered.

Although the order of the components of the vector can be arbitrary in a large number of situations, it is possible to establish an order among these components according to the spatial and/or temporal dynamics of the signals. Thus, two consecutive components in a given context can represent signals that have a close spatial and/or temporal dynamics.

FIGS. 4a to 4d are examples of a representation of four standard contexts.

In order to detect patterns in the signals, it is possible to define standard contexts which will be compared to the previously defined contexts S.

Figure 3A:
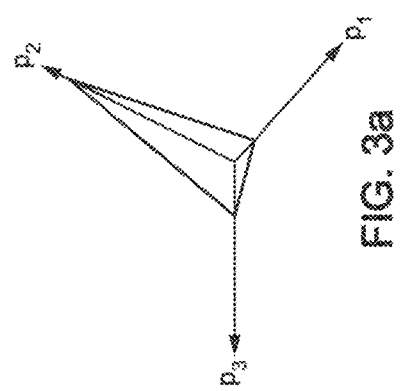

For example, the context of FIG. 3a can be compared with each one of the standard contexts 401, 402, 403 and 404.

Of course, as for contexts, the standard contexts can have multiple equivalent representations (graphics or not): the graphical representation used here is retained only for the visual simplicity that the latter procures.

These standard contexts can thus be compared with the determined contexts in the signals. The standard context that is the closest to the determined context is then retained. In order to measure the proximity between two contexts (seen as vectors), it is possible to use any distance (in the mathematical sense) between these two vectors.

Of course, each standard context can be associated with a given pattern: for example the standard context 402 can correspond to a mechanical failure of an engine while the standard context 401 corresponds to a normal operation of said engine.

In the embodiment where the components of the contexts have an order as a function of the spatial and/or temporal dynamics of the signals, the distance used for the minimisation of the distance between the context and the standard contexts can take this order into account.

As a complement or as an alternative, it is also possible (FIG. 4e) to generate events for new asynchronous signals when a standard context is retained/recognised:

when the standard context 401 is recognised at a given instant in the received signals $p_1$, $p_2$ and $p_3$ an event is generated in the signal 411;

when the standard context 402 is recognised at a given instant in the received signals $p_1$, $p_2$ and $p_3$ an event is generated in the signal 412;

when the standard context 403 is recognised at a given instant in the received signals $p_1$, $p_2$ and $p_3$ an event is generated in the signal 413;

when the standard context 404 is recognised at a given instant in the received signals $p_1$, $p_2$ and $p_3$ an event is generated in the signal 414.

In this example, four new asynchronous signals are thus generated and can be the object of the same analysis as before with a new base of standard contexts (often referred to as "standard contexts of a higher hierarchical level"). Each one of these new standard types will here have four dimensions (equal to the number of asynchronous signals to be analysed).

Thus, this method (i.e. analyse) can be recursive and be iterated as many times as the number of hierarchical levels defined for the standard contexts.

With regards to the decrease in the activity profiles of FIGS. 2a and 2b for example, it is possible to provide that their decrease is less and less substantial as the iterations occur in the hierarchical model. This reduction in the speed of the decrease makes it possible to take account of a different reactivity as a function of the level of the hierarchical model of the standard contexts (and therefore better pattern recognition).

Once all of the hierarchical levels have been used/passed through (with the hierarchical model able to comprise only a single level in a particular case), it is possible to define a signature.

Figure 4F:
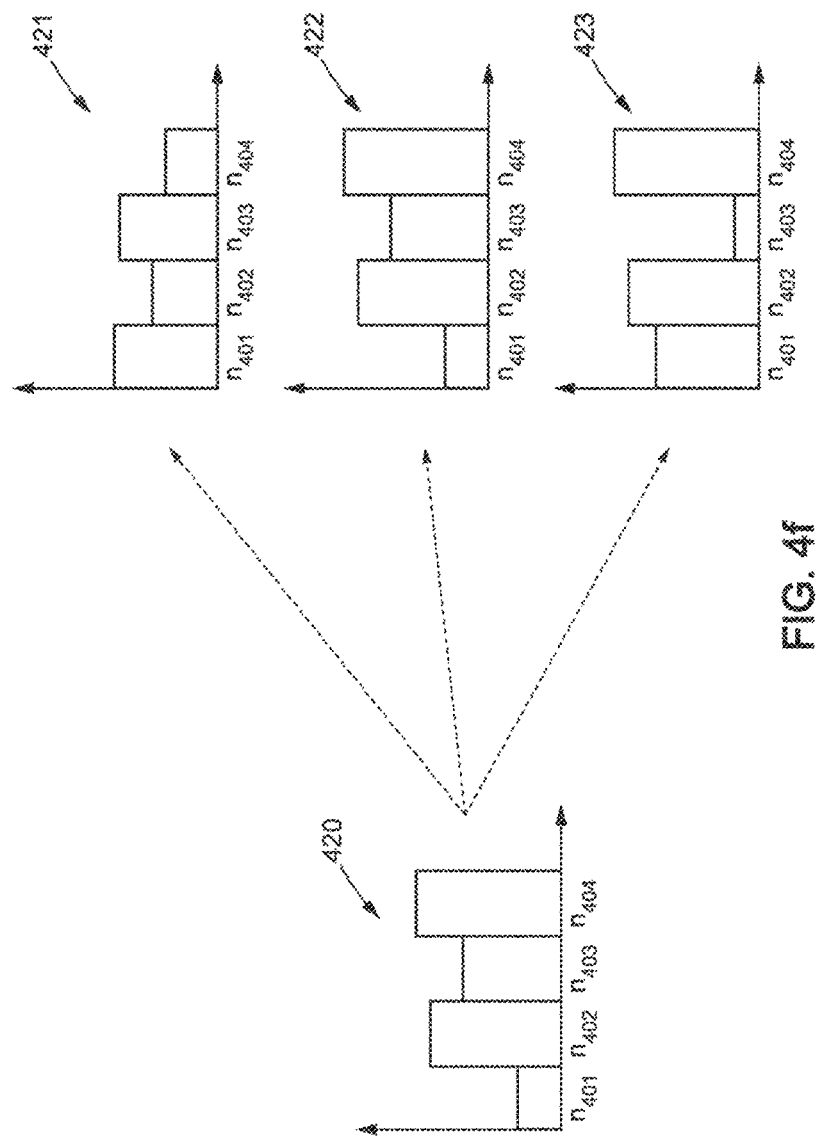
FIG. 4f is an example of determining a signature for four event flows.

FIG. 4f is an example of determining a signature for four event flows.

In this example, the signature is defined as being the vector or the histogram 420 of the number of occurrence (respectively $n_{401}$, $n_{402}$, $n_{403}$, $n_{404}$) of each one of the determined standard contexts (respectively 401, 402, 403, 404) for the latest occurrence of the method described hereinabove.

It is then possible to find, in a base of standard signatures (421, 422, 423), the standard signature that is closest to the determined signature. This proximity can be established by using any distance whatsoever in the mathematical sense.

The distance between two histograms $\mathcal{H}_1$ and $\mathcal{H}_2$ (for example 420 and 421) can be calculated as a mathematical distance between two vectors having for coordinates the number of occurrences for each one of the standard contexts:

$$d(\mathcal{H}_1; \mathcal{H}_2) = \|\mathcal{H}_1 - \mathcal{H}_2\|$$

It is also possible to calculate a standardised distance such as follows:

$$d^N(\mathcal{H}_1; \mathcal{H}_2) = \left\| \frac{\mathcal{H}_1}{\text{card}(\mathcal{H}_1)} - \frac{\mathcal{H}_2}{\text{card}(\mathcal{H}_2)} \right\|$$

with card ($\mathcal{H}_1$) the number of standard contexts (i.e. vertical bar) of the histogram $\mathcal{H}_j$.

The Bhattacharyya distance can also be used as a replacement for the conventional distance:

$$d^B(\mathcal{H}_1; \mathcal{H}_2) = -\ln \sum_i \left( \left\| \frac{\mathcal{H}_1(i)}{\text{card}(\mathcal{H}_1)} \cdot \frac{\mathcal{H}_2(i)}{\text{card}(\mathcal{H}_2)} \right\| \right)$$

with $\mathcal{H}_j(i)$ the number of occurrences of the $i^{th}$ standard context of the histogram $\mathcal{H}_j$.

It has been observed experimentally that the Bhattacharyya distance or a standardised distance gave very good results. Any other mathematical distance can also be sued.

The signature can also be the general form of the asynchronous signals of the four event flows.

Each one of the standard signatures can be associated with a give pattern in the received signals: for example the standard signature 421 can correspond to a mechanical failure of an engine while the standard signature 422 corresponds to a normal operation of said engine.

Figure 5A:
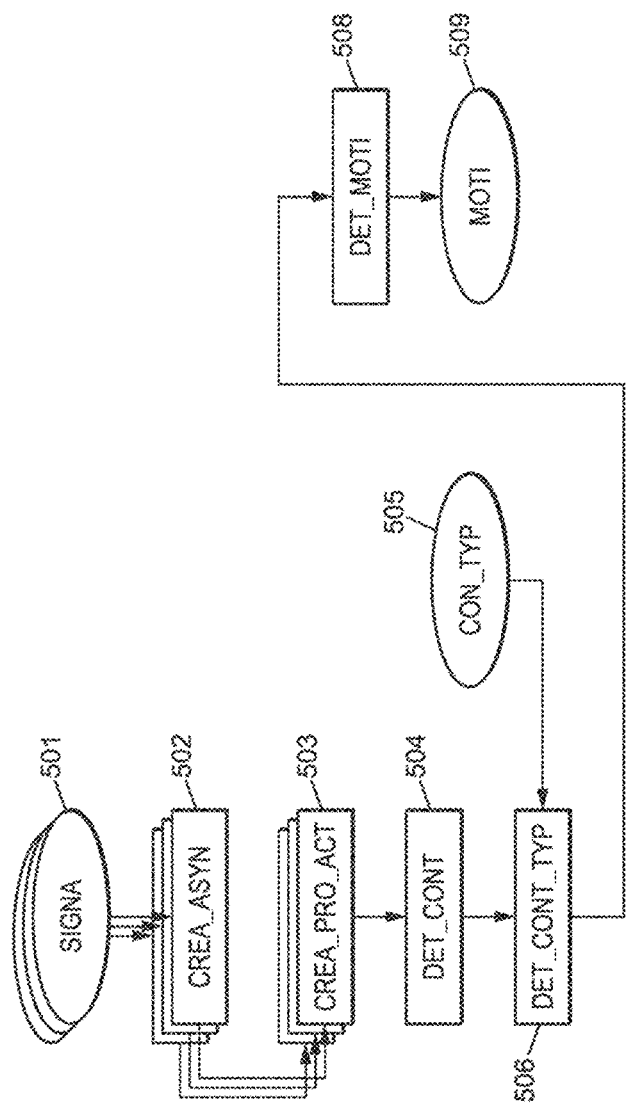
FIG. 5a is an example of a flowchart of a method according to a possible embodiment of the invention (i.e. without the use of a hierarchical model of standard contexts)

FIG. 5a is an example of a flowchart of a method according to a possible embodiment of the invention (i.e. without the use of a hierarchical model of standard contexts).

Upon receiving signals 501, it is possible to create (step 502) asynchronous signals by generating events based on detections of characteristics of the signal, such as described in relation with the FIGS. 1a and 1b.

Once these asynchronous signals are created, it is possible to create (step 503), from each asynchronous signal created, an activity profile as described in relation with FIGS. 2a and 2b.

These activity profiles make it possible, for a given time, to determine (step 504) a context as described in relation with FIGS. 3a, 3b and 2a. The determined context can be defined as a vector of the values of the activity profiles, at the given time, of the created asynchronous signals.

Moreover, it is also possible to determine (step 506) a standard context from among a set of predetermined standard contexts (for example, pre-calculated and stored in a database 505) by minimising the distance between the context determined in step 504 and the standard contexts.

Based on the determined standard context, it is then possible to determine (step 508) a "pattern" 509 in the plurality of received signals. In this hypothesis, it is advantageous to associate a "pattern" with each one of the standard contexts. Then, when the standard context is identified, it is possible to carry out a query in an association database in order to retrieve the associated pattern.

FIG. 5b is an example of a flowchart of a method according to another possible embodiment of the invention (i.e. with the use of a hierarchical model of standard contexts).

Upon receiving signals 501, it is possible to create (step 502) asynchronous signals by generating events based on detections of characteristics of the signal, such as was described in relation with FIGS. 1a and 1b.

Once these asynchronous signals are created, it is possible to create (step 503), from each asynchronous signal created, an activity profile as described in relation with FIGS. 2a and 2b.

These activity profiles make it possible, for a given time, to determine (step 504) a context as described in relation with FIGS. 3a, 3b and 2a. The determined context can be defined as a vector of the values of the activity profiles, at the given time, of the created asynchronous signals. This determination can be carried out for a plurality of given times (e.g. this plurality of times being a sampling of the time with a predetermined pitch).

Then, it is possible to use the events of each asynchronous signal which have just been created as current events.

Moreover, having a hierarchical model of standard contexts (e.g. stored in a database 511, having max_k levels), it is possible to take the standard contexts of the first level (k=1) as current standard contexts.

Once a context is determined, it is also possible to determine (step 506) a standard context among the current standard contexts by minimising the distance between the context determine in the step 504 and the current standard contexts.

Each recognition of a standard context can allow for the generating (step 512) of an event as described in relation with FIG. 4e. Each possible standard model can allow for the generation of a clean asynchronous signal. Note that this step 512 is optional if all the levels of the hierarchical model have already been used (i.e. k=max_k).

Once these steps (506, 512) have been carried out for the plurality of times mentioned hereinabove, it is possible to change the level in the hierarchical model (step 513, e.g. k=k+1). If a level of the hierarchical model has not been used (i.e. k<=max_k, output OK from step 513), it is possible to reiterate the steps 506, 512 and 513 by using the new asynchronous signals created (i.e. by considering the events generated in the step 512 during the last iteration as current events) and by using the new standard contexts (i.e. those of the higher hierarchical level chosen in the step 513) as current standard contexts.

Moreover, it is also possible to use as an additional asynchronous signal (i.e. in addition to the new asynchronous signals created) an asynchronous signal coming from a step similar to step 502. Indeed, if a received signal is a fast signal (of which the variations are notable for a predetermined period of time), it is advantageous to process it using the first levels of the hierarchical model. However, if the received signal is slow (its variations are negligible over the predetermined period of time), it can be advantageous to not process it with the first levels of the hierarchical model and to wait for a later hierarchical level so as to integrate it into the asynchronous signals to be processed by step 504. This integrating of this asynchronous signal will be done in parallel with the asynchronous signals generated in step 512 for the "faster" signals that are already integrated. Thus, it is possible to carry out a pre-analysis of the received signals 501 in order to classify them as a function of their spatial and/or temporal dynamics: this classification can then know the level v of the hierarchical model from which each signal is integrated into the loop defined by the steps 506, 512 and 513.

If all of the levels of the hierarchical model have been used, it is then possible to determine a "pattern" via a comparison 507 of the standard contexts determined at the last occurrence of the step 506 with a base of standard signatures 510. This comparison can comprise for example the calculation of the number of occurrences of determining standard contexts at the last occurrence of the step 506 such as is described in relation with FIG. 4f. The comparison can also be a comparison of distance between the asynchronous signals generated at the last occurrence of the step 513 (in this hypothesis the step 513 has to be executed when the last level of the hierarchical model is used) and a signature base.

In this hypothesis, it is advantageous to associate with each one of the signatures of the signature base a "pattern". Then, when the signature is identified, it is possible to carry out a query in an association database in order to retrieve the associated pattern.

Figure 6:
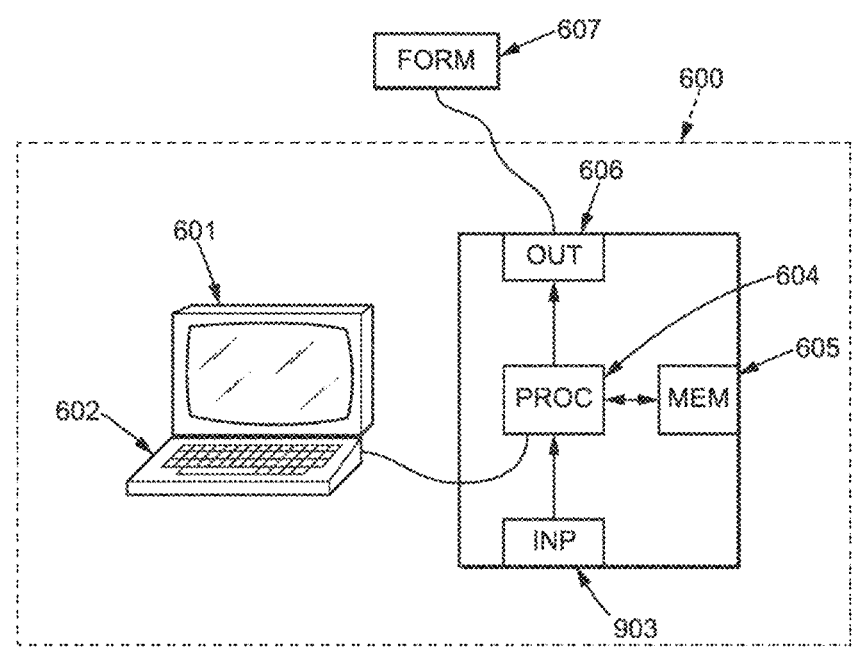
FIG. 6 shows a device for implementing an embodiment according to the invention.

FIG. 6 shows an example of a device for pattern recognition in an embodiment of the invention.

In this embodiment, the device comprises a computer 600, comprising a memory 605 for storing instructions allowing for the implementing of the method, the measurement data received, and temporary data for carrying out the various steps of the method such as described hereinabove.

The computer further comprises a circuit 604. This circuit can be, for example:
  a processor able to interpret instructions in the form of a computer program.
  an electronic board or an electronic circuit whether or not specific of which the steps of the method of the invention are described in the silicon.
  a programmable electronic chip such as a FPGA chip (for "Field-Programmable Gate Array") of which the steps of the method of the invention are described, for example, in a VHDL or Verilog code (hardware description languages that make it possible to represent the behaviour and the architecture of an electronic system).

This computer comprises an input interface 603 for receiving the signals to be analysed, and an output interface 606 for supplying the recognised pattern. Finally, the computer can comprise, in order to allow for easy interaction with a user, a screen 601 and a keyboard 602. Of course, the keyboard is optional, in particular in the framework of a computer that has the form of a touch-sensitive tablet, for example.

Moreover, the block diagram shown in FIG. 5a or 5b is a typical example of a program of which certain instructions can be carried out with the device described. As such, FIG. 5a or 5b can correspond to the flowchart of the general algorithm of a computer program in terms of the invention.

Of course, this invention is not limited to the embodiments described hereinabove as examples; it extends to other alternatives.

Other embodiments are possible.

For example, although the examples given are of a particular field, the method proposed can make it possible to analyse any type of data/signals in any possible industrial field, without any particular limitation.

The invention claimed is:

1. A method for pattern recognition in a plurality of time signals of different types for medical and industrial applications, the method comprising:
   receiving the plurality of time signals;
   for each received signal of the plurality of signals, creating an asynchronous time signal comprising events, said events being of a same form and representative of a characteristic of the received signal;
   for each of the created asynchronous signals, creating an activity profile of said asynchronous signal, the activity profile comprising at least one activity value that decreases as a function of the time elapsed since an event that is a most recent event among successive ones of the events of said asynchronous signal; and
   for a given time:
      determining a context being defined as a set of activity profiles, at the given time, of the created asynchronous signals,
      determining a standard context from among a set of predetermined standard contexts, the determined standard context having, among the set of predetermined standard contexts, a minimum distance to the determined context, and determining a pattern as a function of said determined standard context.

2. A method for pattern recognition in a plurality of time signals of different types for medical or industrial applications, a hierarchical model of standard contexts being defined, each standard context being associated with a respective level of the hierarchical model, the method comprising the steps of:
- a) receiving the plurality of time signals;
- b) for each received signal of the plurality of signals, creating an asynchronous time signal comprising events, said events being of a same form as the asynchronous signal representative of a characteristic of the received signal;
- b') using the events of each of the asynchronous signals as current events and using standard contexts of a first level of the hierarchical model as current standard contexts;
- c) for each of the created asynchronous signals, creating an activity profile of said asynchronous signal, the activity profile comprising at least one activity value that decreases as a function of the time elapsed since an event that is a most recent event among successive ones of the events of said asynchronous signal;
- d) for each given time among a plurality of given times:
    - d1) determining a context being defined as a set of the values of the activity profiles, at the given time, of the created asynchronous signals,
    - d2) determining a standard context among the current standard contexts, the determined standard context having, among the set of current standard contexts, a minimum distance to the determined context, and
    - d3) when a level of the hierarchical model has not been used, generating an event for one of the asynchronous signals as a function of the determined current standard context;
- e) when the level of the hierarchical model has not been used:
    - using the generated events generated in step d3) as current events, and
    - using the standard contexts of a level of the hierarchical model not yet used as current standard contexts;
  re-executing steps c-e; and
- f) when all of the levels of the hierarchical model have been used:
    - determining a pattern in the plurality of received signals via a comparison of the standard contexts determined at a last occurrence of the step d with a base of standard signatures.

3. The method according to claim 2, wherein the comparison of the step f comprises calculating a Bhattacharyya distance.

4. The method according to claim 2, wherein the comparison of the step f comprises calculating a standardized distance.

5. The method according to claim 2, wherein the comparison of the step f is a comparison between a number of occurrences of determining standard contexts at the last occurrence of the step d2 with the base of standard signatures.

6. The method according to claim 2, wherein the decrease in the activity profile is a function of the level of the current hierarchical model.

7. A non-transitory computer-readable medium on which is stored a computer program comprising instructions for implementing the method according to claim 1, when the program is executed by a processor.

8. A non-transitory computer-readable medium on which is stored a computer program comprising instructions for implementing the method according to claim 2, when the program is executed by a processor.

9. A non-transitory computer-readable medium on which is stored a computer program comprising instructions for implementing the method according to claim 3, when the program is executed by a processor.

10. A non-transitory computer-readable medium on which is stored a computer program comprising instructions for implementing the method according to claim 4, when the program is executed by a processor.

11. A non-transitory computer-readable medium on which is stored a computer program comprising instructions for implementing the method according to claim 5, when the program is executed by a processor.

12. A non-transitory computer-readable medium on which is stored a computer program comprising instructions for implementing the method according to claim 6, when the program is executed by a processor.

* * * * *